(12) United States Patent
Oh et al.

(10) Patent No.: US 11,012,754 B2
(45) Date of Patent: *May 18, 2021

(54) DISPLAY APPARATUS FOR SEARCHING AND CONTROL METHOD THEREOF

(71) Applicant: SAMSUNG ELECTRONICS CO., LTD., Suwon-si (KR)

(72) Inventors: Seok-jae Oh, Suwon-si (KR); Sung-yoon Song, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,258

(22) Filed: Sep. 11, 2018

(65) Prior Publication Data
US 2019/0014384 A1    Jan. 10, 2019

Related U.S. Application Data

(63) Continuation of application No. 14/965,944, filed on Dec. 11, 2015, now Pat. No. 10,091,560.

(30) Foreign Application Priority Data

Apr. 1, 2015 (KR) .................. 10-2015-0046022

(51) Int. Cl.
*H04N 5/445* (2011.01)
*H04N 21/482* (2011.01)
(Continued)

(52) U.S. Cl.
CPC ....... *H04N 21/4828* (2013.01); *H04N 21/222* (2013.01); *H04N 21/23418* (2013.01);
(Continued)

(58) Field of Classification Search
CPC .......... H04N 21/4524; H04N 21/4828; H04N 21/4622
(Continued)

(56) References Cited

U.S. PATENT DOCUMENTS

| 8,776,141 B2 | 7/2014 | Lee et al. |
| 2007/0060114 A1 | 3/2007 | Ramer et al. |

(Continued)

FOREIGN PATENT DOCUMENTS

| CN | 103081497 A | 5/2013 |
| EP | 2059021 A1 | 5/2009 |

(Continued)

OTHER PUBLICATIONS

Communication dated Apr. 3, 2019, issued by Korean Intellectual Property Office in counterpart Korean Application 10-2015-0046022.

(Continued)

*Primary Examiner* — Jivka A Rabovianski
(74) *Attorney, Agent, or Firm* — Sughrue Mion, PLLC

(57) ABSTRACT

A display apparatus for searching and a control method thereof are provided. The method includes displaying an image content, determining whether a search function is performed while the image content is displayed, and in response to the determining that the search function is performed while the image content is displayed, transmitting information of the image content to an external server. The method further includes receiving, from the external server, information of a search record of one or more viewers of the image content, and providing information of one or more search terms that are related to the image content, based on the information of the search record.

16 Claims, 16 Drawing Sheets

(51) Int. Cl.
  *H04N 21/25*   (2011.01)
  *H04N 21/258*  (2011.01)
  *H04N 21/4722* (2011.01)
  *H04N 21/222*  (2011.01)
  *H04N 21/234*  (2011.01)
(52) U.S. Cl.
  CPC ..... *H04N 21/252* (2013.01); *H04N 21/25891* (2013.01); *H04N 21/4722* (2013.01); *H04N 21/4826* (2013.01)
(58) Field of Classification Search
  USPC ............................................. 725/53, 37, 39
  See application file for complete search history.

(56) References Cited

U.S. PATENT DOCUMENTS

| | | |
|---|---|---|
| 2008/0244668 A1 | 10/2008 | White |
| 2009/0113475 A1* | 4/2009 | Li .................... G06F 16/7335 725/39 |
| 2009/0125941 A1 | 5/2009 | Koh |
| 2010/0162164 A1 | 6/2010 | Kwon |
| 2011/0113445 A1 | 5/2011 | Lee |
| 2011/0238661 A1 | 9/2011 | Goto |
| 2011/0289098 A1 | 11/2011 | Oztaskent |
| 2012/0054795 A1 | 3/2012 | Kang et al. |
| 2012/0019732 A1 | 6/2012 | Lee |
| 2012/0143902 A1 | 6/2012 | Son et al. |
| 2012/0291072 A1* | 11/2012 | Maddison .......... H04N 21/4524 725/53 |
| 2013/0104172 A1 | 4/2013 | Lee et al. |
| 2013/0298162 A1* | 11/2013 | Cho ................ H04N 21/23418 725/43 |
| 2014/0172816 A1 | 6/2014 | Lee et al. |
| 2014/0215527 A1 | 7/2014 | Henty |
| 2014/0279993 A1 | 9/2014 | Bernhardt et al. |
| 2014/0337309 A1 | 11/2014 | Thollot et al. |
| 2015/0086174 A1 | 3/2015 | Abecassis et al. |

FOREIGN PATENT DOCUMENTS

| | | |
|---|---|---|
| KR | 10-2009-0048700 A | 5/2009 |
| KR | 10-2010-0071620 A | 6/2010 |
| KR | 10-2013-0044770 A | 5/2013 |
| KR | 10-2013-0090497 A | 8/2013 |
| KR | 10-2013-0124767 A | 11/2013 |
| KR | 10-2014-0000754 A | 1/2014 |
| KR | 10-2014-0077535 A | 6/2014 |
| WO | 2012015118 A1 | 2/2012 |

OTHER PUBLICATIONS

Communication dated Jan. 2, 2019, issued by the State Intellectual Property Office of P.R. China in counterpart Chinese Application No. 201610064638.0.
Communication dated Aug. 8, 2016 issued by the European Patent Office in counterpart European Patent Application No. 15203204.1.
Communication dated Jun. 29, 2017, issued by the European Patent Office in counterpart European Patent Application No. 15203204.1.
Communication dated Oct. 9, 2019, from the State Intellectual Property Office of People's Republic of China in counterpart Application No. 201610064638.0.
Communication dated Oct. 23, 2019, issued by the Korean Intellectual Property Office in corresponding Korean Application No. 10-2015-0046022.
Communication dated Jan. 22, 2020, issued by the State Intellectual Property Office of P.R. China in counterpart Chinese Application No. 201610064638.0.
Communication dated Feb. 6, 2020, issued by the European Patent Office in counterpart European Application No. 15 203 204.1.
Communication dated Jun. 26, 2019, from the State Intellectual Property Office of People's Republic of China in counterpart Application No. 201610064638.0.
Decision to Refuse communication dated Jul. 23, 2020 from the European Patent Office in application No. 15203204.1.

* cited by examiner

FIG. 5A
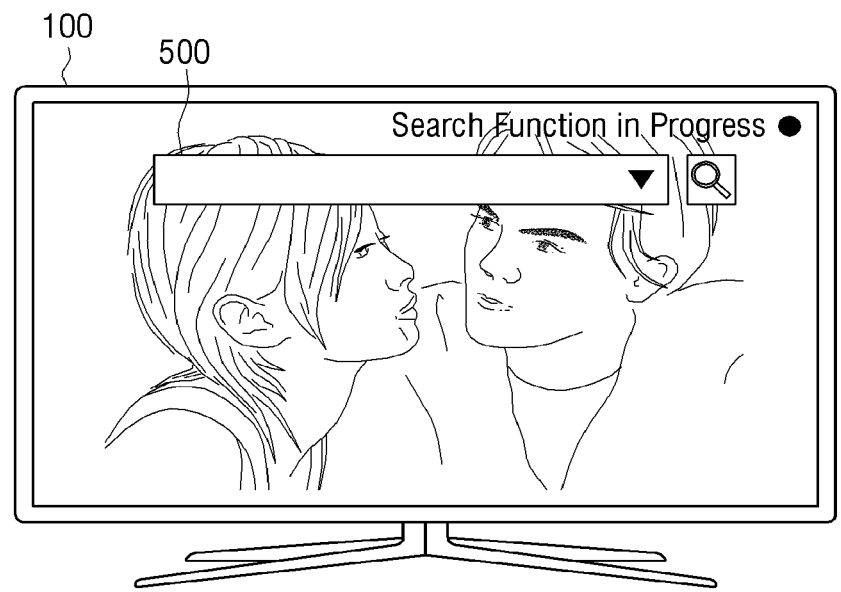
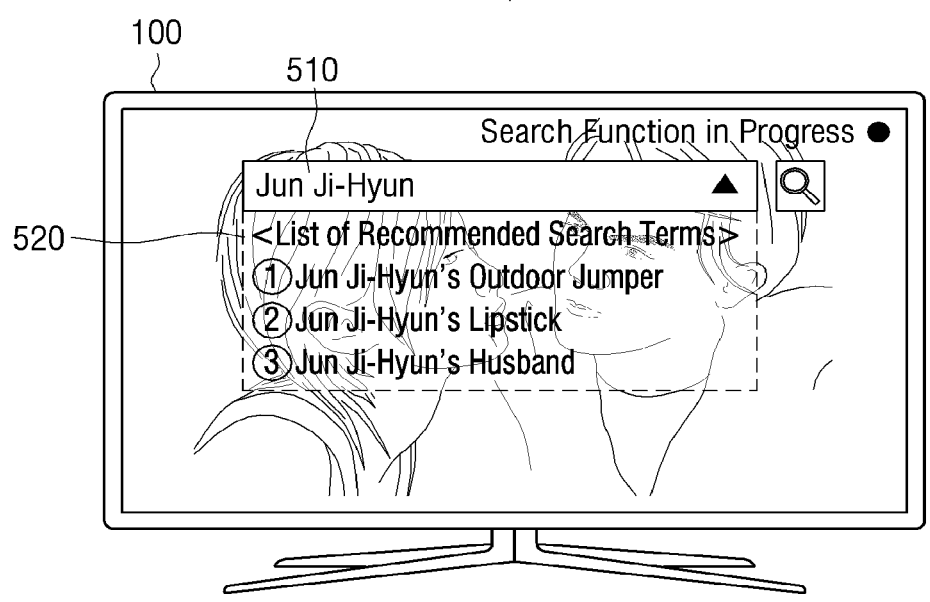

FIG. 5B
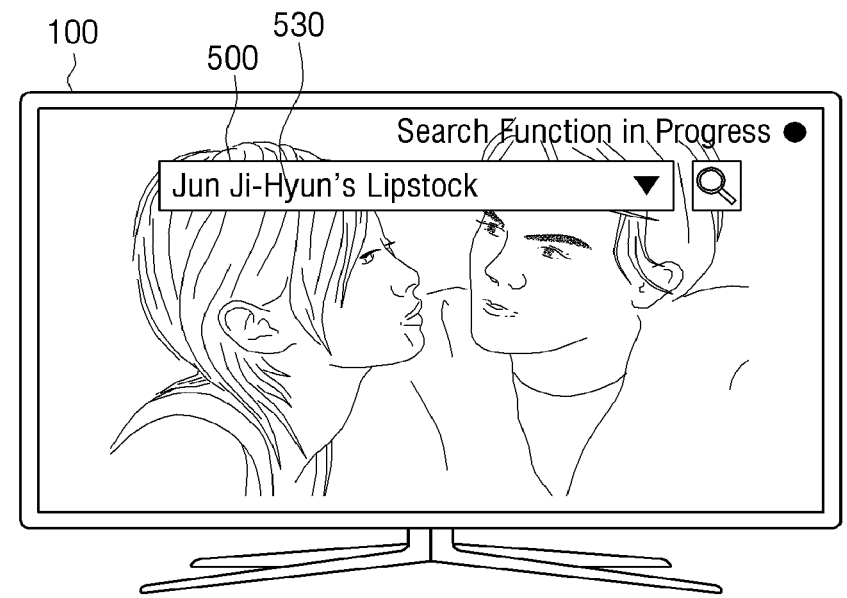
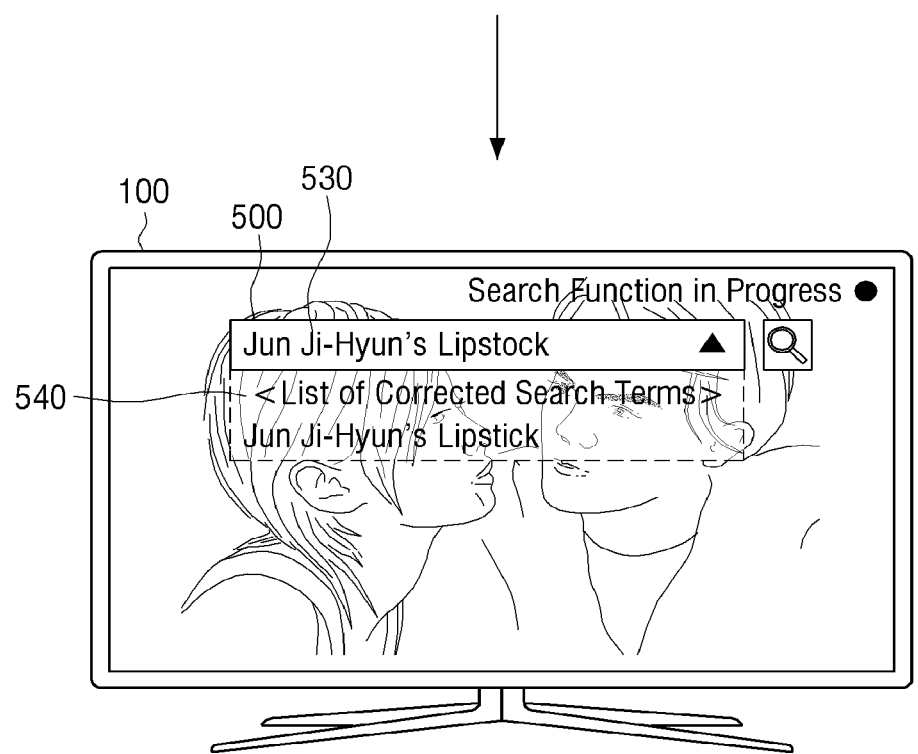

FIG. 9A
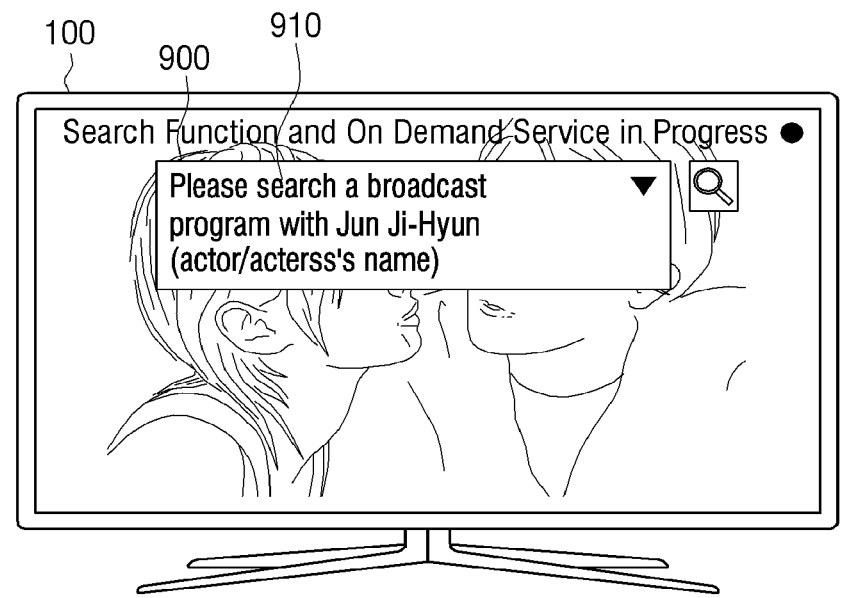
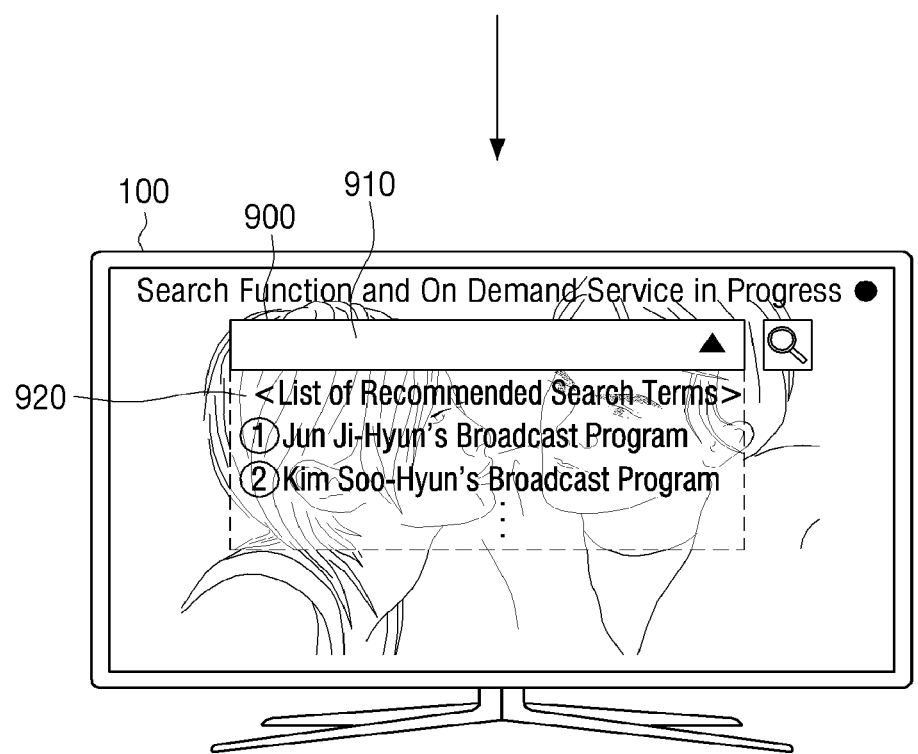

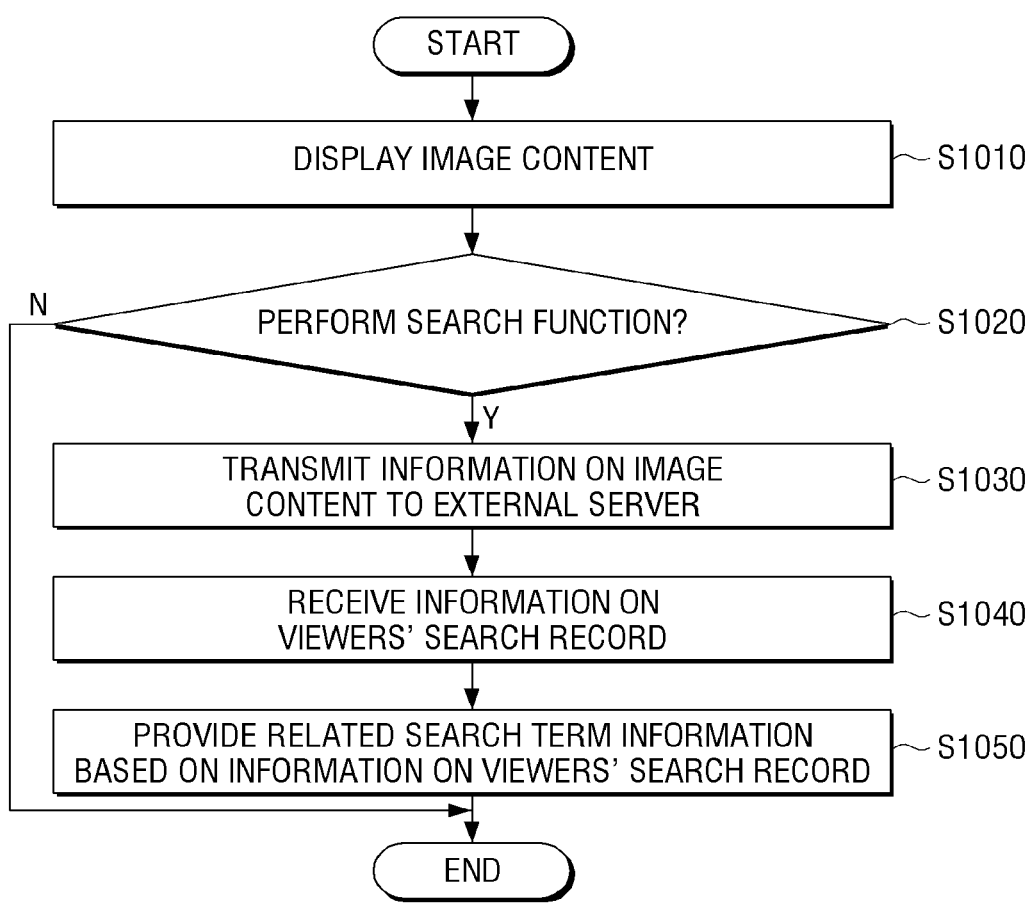

DISPLAY APPARATUS FOR SEARCHING AND CONTROL METHOD THEREOF

CROSS-REFERENCE TO RELATED APPLICATIONS

This application is a continuation of Application Ser. No. 14/965,944, filed Dec. 11, 2015, which is based upon and claims priority from Korean Patent Application No. 10-2015-0046022, filed on Apr. 1, 2015, in the Korean Intellectual Property Office, the disclosures of which are incorporated herein in their entireties by reference.

BACKGROUND

1. Field

Apparatuses and methods consistent with exemplary embodiments relate to a display apparatus for searching and a control method thereof, and more particularly, to a display apparatus that can recommend and correct a search term corresponding to a search term that is input by a user, based on content information, and a control method thereof.

2. Description of the Related Art

Thanks to the development of electronic technology, electronic devices with various functions have been developed and distributed. In particular, various kinds of display apparatuses including a TV are used in general households. The display apparatuses have been advanced to be provided with various functions according to users' needs. In particular, the TV can be connected with the Internet and thus can support Internet services. In addition, the user can watch many digital broadcasting channels through the TV.

In dramas or entertainment programs broadcasted through these channels, latest trend-led products or hot places frequently appear. When a user is interested in the products or places that the user meets through the screen, the user may make an effort to know the products or places, such as directly searching through the Internet or asking the people around the user. However, it may not be easy for the user to exactly memorize the appearance of the products or places, which flash by in the broadcasted program, and to search for the products or places.

In addition, the search function through the related-art display apparatus is based on image content information, and thus there is no search term and query language recommendation related to similar groups watching the same content, and there is no search term correction technology. Thus, the search function in the display apparatus is limited and may cause inconvenience.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a display apparatus that can perform a search function using content information and search information of similar groups watching the same content, and a control method thereof.

According to an aspect of an exemplary embodiment, there is provided a method for controlling a display apparatus for searching, the method including displaying an image content, determining whether a search function is performed while the image content is displayed, and in response to the determining that the search function is performed while the image content is displayed, transmitting information of the image content to an external server. The method further includes receiving, from the external server, information of a search record of one or more viewers of the image content, and providing information of one or more search terms that are related to the image content, based on the information of the search record.

The transmitting may include in response to the determining that the search function is performed, analyzing the image content that is currently displayed based on information of an electronic program guide, transmitting a result of the analyzing to the external server as the information of the image content, capturing a screen of the image content, and transmitting the captured screen to the external server as the information of the image content.

The information of the search record may include at least one among information of a record of a search term of other viewers regarding the image content, and information of a record of a search term that was previously searched by a user.

The providing may include analyzing the information of the search record in real time, and providing information of a recommended search term that is inputtable by a user, based on a result of the analyzing.

The providing may include receiving an input of a search term from a user, analyzing the search term in real time based on the information of the search record, and providing information of a corrected search term that is related to the search term, based on a result of the analyzing.

The method may further include transmitting, to an external device, at least one among the information of the search record, and the information of the one or more search terms.

According to an aspect of another exemplary embodiment, there is provided a display apparatus for searching, the display apparatus including a display configured to display an image content, a communicator configured to communicate with at least one among an external server and an external device, and a controller configured to determine whether a search function is performed while the image content is displayed, and in response to the controller determining that the search function is performed while the image content is displayed, control the communicator to transmit information of the image content to the external server. The controller may be further configured to control the communicator to receive, from the external server, information of a search record of one or more viewers of the image content, and provide information of one or more search terms that are related to the image content, based on the information of the search record.

The controller may be further configured to in response to the controller determining that the search function is performed, analyze the image content that is currently displayed based on information of an electronic program guide, control the communicator to transmit a result of the analyzing to the external server as the information of the image content, capture a screen of the image content, and control the communicator to transmit the captured screen to the external server as the information of the image content.

The controller is further configured to analyze the information of the search record in real time, and provide information of a recommended search term that is inputtable by a user, based on a result of the analyzing.

The controller may be further configured to receive an input of a search term from a user, analyze the search term in real time based on the information of the search record, and provide information of a corrected search term that is related to the search term, based on a result of the analyzing.

The controller may be further configured to control the communicator to transmit, to the external device, at least one among the information of the search record, and the information of the one or more search terms.

According to an aspect of another exemplary embodiment, there is provided a search function execution system including a display apparatus configured to determine whether a search function is performed while an image content is displayed, and in response to the display apparatus determining that the search function is performed while the image content is displayed, transmit information of the image content to an external server. The external server is configured to extract information of a search record of one or more viewers of the image content, and transmit the information of the search record to the display apparatus, and the display apparatus is further configured to provide information of one or more search terms that are related to the image content, based on the information of the search record. The external device is configured to receive, from the display apparatus, at least one among the information of the search record, and the information of the one or more search terms.

The external server may be further configured to extract the information of the search record based on at least one among the information of the image content and a record of a search term of other viewers regarding the image content.

The external server may be further configured to receive, from the display apparatus, an input of a search term that is input by a user, and extract the information of the search record based on at least one among the input search term, the information of the image content, and a record of a search term of other viewers regarding the image content.

The display apparatus may be further configured to provide information of one or more broadcast programs based on a selection of a respective one of the one or more search terms.

BRIEF DESCRIPTION OF THE DRAWINGS

The above and/or other aspects will be more apparent by describing exemplary embodiments, with reference to the accompanying drawings, in which:

FIGS. 5A and 5B are views illustrating a function of displaying a list of recommended search terms or a list of corrected search terms based on information that a display apparatus receives from an external server while executing a search function according to an exemplary embodiment;

FIGS. 8A, 8B, 9A, and 9B are views illustrating an on demand service of a video on demand (VOD) or a DVD using a search function of a display apparatus according to one or more exemplary embodiments;

FIG. 10 is a flowchart illustrating a method for providing a search function of a display apparatus according to one or more exemplary embodiments.

DETAILED DESCRIPTION OF THE EXEMPLARY EMBODIMENTS

Figure 1:
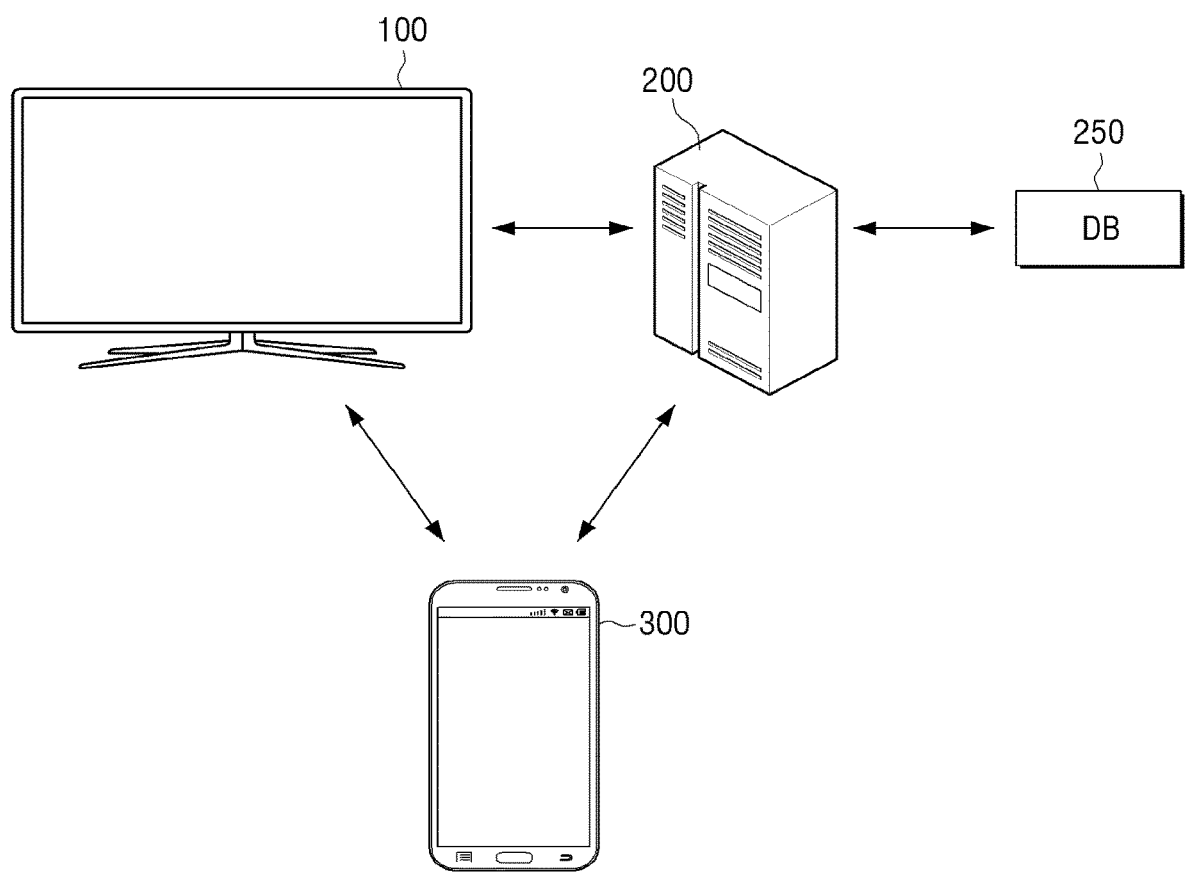
FIG. 1 is a view showing a configuration of a search function execution system according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

FIG. 1 is a view showing a configuration of a search function execution system according to an exemplary embodiment. As shown in FIG. 1, the search function execution system includes a display apparatus 100, an external server 200, a database (DB) 250 (other external servers), and an external device 300.

The display apparatus 100 may include a TV, a Hybrid Broadcast Broadband TV (HBBTV), a smart TV, an Internet Protocol TV (IPTV), etc., but is not limited to these, and may be various kinds of apparatuses provided with a display function, which receive broadcast signals and exchange data through a network, such as an electronic album, a PC, a laptop PC, a Personal Digital Assistant (PDA), etc.

In addition, the external device 300 may be various kinds of portable devices such as a mobile phone, a PDA, an MP3 player, a navigation device, etc.

According to an exemplary embodiment, when the display apparatus 100 executes a search function, the external server 200 may receive information on an image content from the display apparatus 100. Thereafter, the external server 200 may extract information on a search record of viewers who are watching the same content using the information received from the display apparatus 100. The external server 200 may transmit the information on the viewers' search record to the display apparatus 100. In this case, when the search system is provided with the separate external server 250, the separate external server 250 may store the information on the image content that is received from the display apparatus 100 and the information on the other viewers' search record of the same image content.

In response to the search function being performed while an image content is displayed, the display apparatus 100 may transmit information on the image content to the external server 200. Thereafter, the external server 200 may extract information on a search record of viewers related to the image content using the information on the image content, and transmit the information on the search record to the display apparatus 100. In addition, the display apparatus 100 may provide related search term information to the user based on the information on the viewers' search record. In this case, the display apparatus 100 may transmit the information on the search record to the external device 300.

In an exemplary embodiment, the display apparatus 100 receives the information on the viewers' search record from the external server 200, and then analyzes the information on the viewers' search record in real time and provides the related search term information. According to another exemplary embodiment, the external server 200 may receive image content information from the display apparatus 100, and then extract search term information related to the image content using the image content information, a search term that is inputted by the user when the user inputs the search term, a search term that was previously inputted by the user, other viewers' search record regarding the image content, and the information on the image content. Thereafter, the external server 200 may transmit the extracted search term information to the display apparatus 100.

Figure 2:
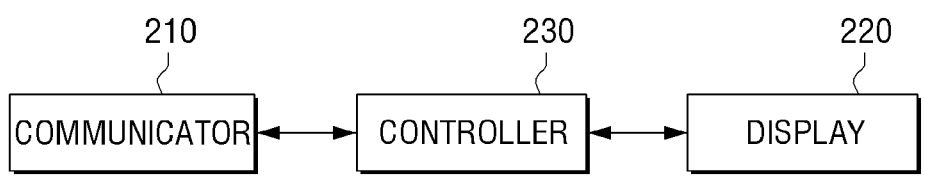
FIG. 2 is a block diagram showing a configuration of a display apparatus according to an exemplary embodiment.

FIG. 2 is a block diagram showing a configuration of the display apparatus 100 according to an exemplary embodiment. As shown in FIG. 2, the display apparatus 100 includes a communicator 210, a display 220, and a controller 230.

In this case, the communicator 210 is configured to communicate with various kinds of electronic devices according to various kinds of communication methods. Hereinafter, the configuration of the communicator 210 will be explained in detail below with reference to FIG. 3.

The display 220 displays an image content under the control of the controller 230. According to an exemplary embodiment, in response to the search function of the display apparatus 100 being performed, the display 220 may display the image content and a list of search terms related to the image content. When the user does not input a search term, the display 220 may display a list of recommended search terms related to the currently displayed image content under the control of the controller 230. According to another exemplary embodiment, when the user inputs a search term, the display 220 may display a list of corrected search terms related to the term inputted by the user, such as an error-corrected term, under the control of the controller 230.

Figure 4A:
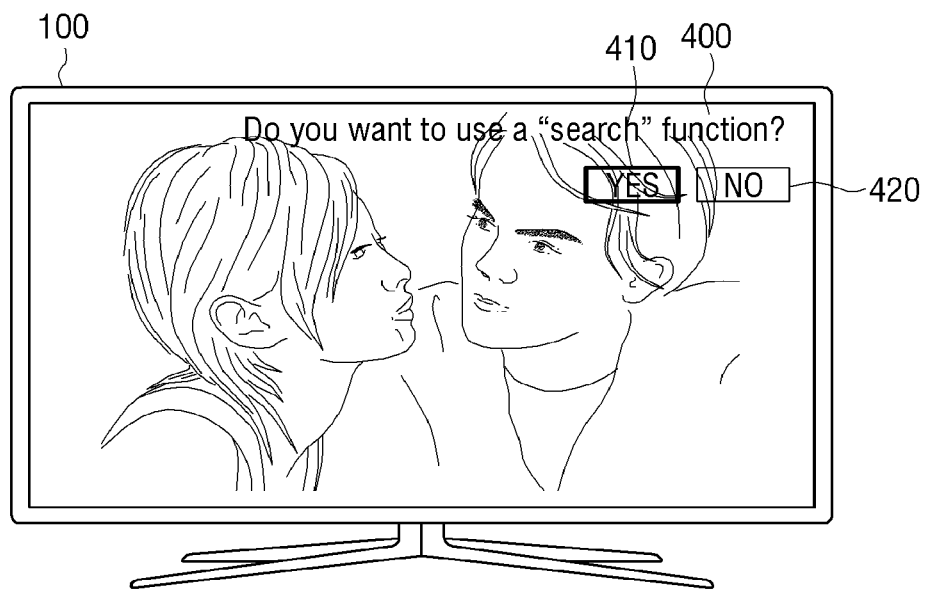
FIGS. 4A and 4B are views illustrating a search function of a display apparatus according to an exemplary embodiment.

According to an exemplary embodiment, the display 220 may display a User Interface (UI) 400 for using the search function of the display apparatus 100 ("Do you want to use a search function?") as shown in FIG. 4A. In this case, in response to the user inputting a selection of 'YES' 410, the display apparatus 100 executes the search function.

According to another exemplary embodiment, in response to the display apparatus 100 executing the search function, the display 220 may display a UI for informing that the search function is currently executed (UI saying "search function in progress" as shown in FIGS. 5A to 6B).

The controller 230 may control the overall operation of the display apparatus 100.

According to an exemplary embodiment, in response to the search function being performed while an image content is displayed, the controller 230 may control the communicator 210 to transmit information on the image content to the external server 200. In addition, the controller 230 may control the communicator 210 to receive information on a search record of viewers who are watching the currently broadcasted image content from the external server 200. In this case, the controller 230 may control the display 220 to display related search term information based on the information on the viewers' search record. In addition, in response to the display apparatus 100 interworking with the external device 300, the controller 230 may control the communicator 210 to transmit at least one among the information on the viewers' search record and the related search term information to the external device 300.

When the search function is performed while the image content is displayed, the controller 230 may analyze the currently reproduced image content based on Electronic Program Guide (EPG) information, and control the communicator 210 to transmit the result of the analyzing to the external server 200 as information corresponding to the image content. In addition, the controller 230 may capture the screen of the image content, and control the communicator 210 to transmit the captured screen to the external server 200 as information on the image content. In this case, the external server 200 may extract the information on the viewers' search record using at least one among the information on the image content (for example, the EPG information, the captured screen), the record of a search term that was previously searched by the user, and the other viewers' search term record on the image content.

According to an exemplary embodiment, in response to the user inputting a search term, the external server 200 may receive the search term that is input by the user, and the information on the image content (for example, the EPG information, the captured screen) from the display apparatus 100, and extract the information on the viewers' search record using at least one among the received search term, a search term that was previously searched by the user, the information on the image content, and the other viewers' search term record on the image content. That is, when the user does not input a search term while the search function of the display apparatus 100 is performed, the external server 200 may extract the information on the viewers' search record using at least one among the information on the image content, the search term that was previously searched by the user, and the other viewers' search term record on the image content.

In addition, when the user inputs a search term while the search function of the display apparatus 100 is performed, the external server 200 may extract the viewers' search record using at least one among the search term that is inputted by the user, the information on the image content, the search term that was previously inputted by the user, and the other viewers' search term record on the image content. Thereafter, the controller 230 of the display apparatus 100 may provide a search term list UI based on the information on the search record that is received from the external server 200.

According to one or more exemplary embodiments described above, the display apparatus that performs the search function using the content information and the search information of similar groups watching the same content can be controlled more easily and efficiently.

Hereinafter, the display apparatus 100 according to one or more exemplary embodiments will be explained with reference to FIGS. 3 to 7.

Figure 3:
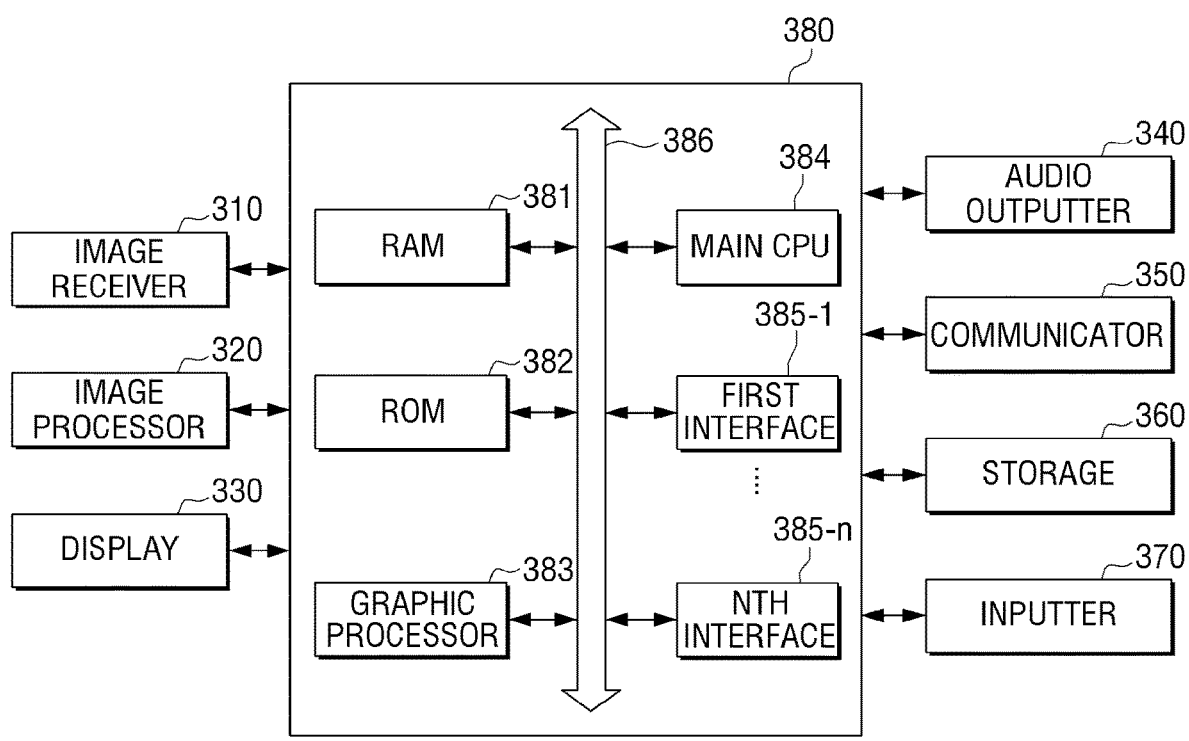
FIG. 3 is a block diagram showing a configuration of a display apparatus in detail according to an exemplary embodiment.

FIG. 3 is a block diagram showing a configuration of the display apparatus 100 in detail according to an exemplary embodiment. As shown in FIG. 3, the display apparatus 100 includes an image receiver 310, an image processor 320, a display 330, an audio outputter 340, a communicator 350, a storage 360, an inputter 370, and a controller 380.

FIG. 3 illustrates various elements of the display apparatus 100 when the display apparatus 100 is provided with various functions such as a display function, a communication function, an image reception function, etc. Therefore, some of the elements shown in FIG. 3 may be omitted or changed, and another element may be added according to an exemplary embodiment.

The image receiver 310 receives image contents from various external sources. The image receiver 310 may receive a broadcast content from an external broadcasting station, and receive an image content from an external electronic device (for example, a DVD player, a set-top box, etc.).

The image processor 320 may process the image content received from the image receiver 310 into data of a displayable format. According to an exemplary embodiment, in response to the search function of the display apparatus 100 being performed, the image processor 320 may capture the screen of the image content under the control of the controller 380. In this case, the controller 380 may control the communicator 350 to transmit the screen captured by the image processor 320 to the external server 200 and the separate external server 250 as information on the image content.

The display 330 displays the image content that is processed by the image processor 320 under the control of the controller 380. In response to the search function being performed while the image content is displayed, the display 330 may display related search term information based on information on a search record of viewers that is received from the external server 200. For example, the display 330 may display a list of recommended search terms that are predicted to be inputted by the user as shown in FIG. 5A, or when the user inputs a search term as shown in FIG. 5B, the display 330 may display a list of corrected search terms related to the search term inputted by the user. This will be explained in detail below.

The audio outputter 340 outputs the audio data of the image content. The audio ouputter 340 may be configured to output various notification sounds or voice message as well as various audio data processed in an audio processor.

The communicator 350 is configured to communicate with various kinds of external devices according to various kinds of communication methods. The communicator 350 may include various communication chips such as a WiFi chip, a Bluetooth chip, a Near Field Communication (NFC) chip, a wireless communication chip, etc. In this case, the WiFi chip, the Bluetooth chip, and the NFC chip perform a WiFi method, a Bluetooth method, and an NFC method, respectively. The NFC chip refers to a chip that operates in the NFC method using a band of 13.56 MHz among various RF-ID frequency bands such as 135 kHz, 13.56 MHz, 433 MHz, 860-960 MHz, 2.45 GHz, etc. When the WiFi chip or the Bluetooth chip is used, a variety of connectivity information such as SSID and a session key may be transmitted and received first, and communication is established using the connectivity information, and then a variety of information may be transmitted and received. The wireless communication chip refers to a chip that performs communication according to various communication standards such as IEEE, Zigbee, $3^{rd}$ Generation (3G), $3^{rd}$ Generation Partnership Project (3GPP), Long Term Evolution (LTE), etc. In response to the search function being performed while the display apparatus 100 displays the image content, the communicator 350 may transmit the information on the image content to the external server 200, and receive the information on the search record of the viewers who are watching the image content from the external server 200.

The storage 360 stores various modules for driving the display apparatus 100. For example, the storage 360 may store software including a base module, a sensing module, a communication module, a presentation module, a web browser module, and a service module. In this case, the base module is a module that processes signals transmitted from hardware included in the display apparatus 100, and transmits the signals to an upper layer module. The sensing module is a module that collects information from various sensors, and analyzes and manages the collected information, and may include a face recognition module, a voice recognition module, an NFC recognition module, etc. The presentation module is a module for configuring a display screen, and may include a multimedia module for reproducing and output a multimedia content, and a UI rendering module for performing UI and graphic processing. The communication module is a module for communicating with the outside. The web browser module is a module that performs web browsing and accesses a web server. The service module is a module that includes various applications for providing various services.

As described above, the storage 360 may include various program modules, but some of the program modules may be omitted, changed, or added according to the type and characteristic of the display apparatus 100. For example, when the display apparatus 100 is implemented as a tablet PC, the base module may further include a location determination module for determining a GPS-based location, and the sensing module may further include a sensing module for detecting a user's motion.

In addition, the storage 360 stores operation information of the display apparatus 100, EPG information, and a screen that is captured by the image processor 320. The storage 360 may be implemented by using hardware or a non-volatile memory.

The inputter 370 receives input of a user command to control the display apparatus 100. In this case, the inputter 370 may be implemented by using a remote controller, but this is an example. The inputter 370 may be implemented by using various input devices such as a touch screen, a voice recognition unit, a motion recognition unit, a pointing device, etc.

The graphic processor 383, the image processor 320, and the controller 380 may be integrated into a single chip. However, this should not be considered as limiting, and the graphic processor 383, the image processor 320, and the controller 380 may be implemented by using various combinations. For example, the graphic processor 383 and the image processor 320 may be implemented by using a single chip, or the image processor 320 and the controller 380 may be implemented by using a single chip.

The controller 380 controls the overall operations of the display apparatus 100 using various programs stored in the storage 360. As shown in FIG. 3, the controller 380 includes a Random Access Memory (RAM) 381, a Read Only Memory (ROM) 382, a graphic processor 383, a main Central Processing Unit (CPU) 384, first to n-th interfaces 385-1 to 385-*n*, and a bus 386. The RAM 381, the ROM 382, the graphic processor 383, the main CPU 384, and the first to n-th interfaces 385-1 to 385-*n* may be connected with one another via the bus 386.

The ROM 382 may store a set of instructions for booting a system. In response to a turn on command being inputted and power being supplied, the main CPU 384 may copy the O/S stored in the storage 360 into the RAM 381 according to a command stored in the ROM 382, and boot the system by executing the O/S. In response to the booting being completed, the main CPU 384 may copy various application programs stored in the storage 360 into the RAM 381, and perform various operations by executing the application programs copied into the RAM 381.

The graphic processor 383 may generate a screen including various objects such as an icon, an image, a text, etc. using a calculator and a renderer. The calculator may calculate attribute values of objects to be displayed according to a layout of the screen, such as a coordinate value, a shape, a size, a color, etc., based on a received control command. The renderer may generate the screen of various layouts including objects based on the attribute values calculated by the calculator. The screen generated in the renderer is displayed within a display area of the display 330.

The main CPU 384 may access the storage 360 and perform booting using the O/S stored in the storage 360. In addition, the main CPU 384 may perform various operations using various programs, content, data, etc., which are stored in the storage 360.

The first to n-th interfaces 385-1 to 385-*n* may be connected with the above-described various elements. One of the interfaces may be a network interface that is connected with an external device via a network.

Figure 4B:
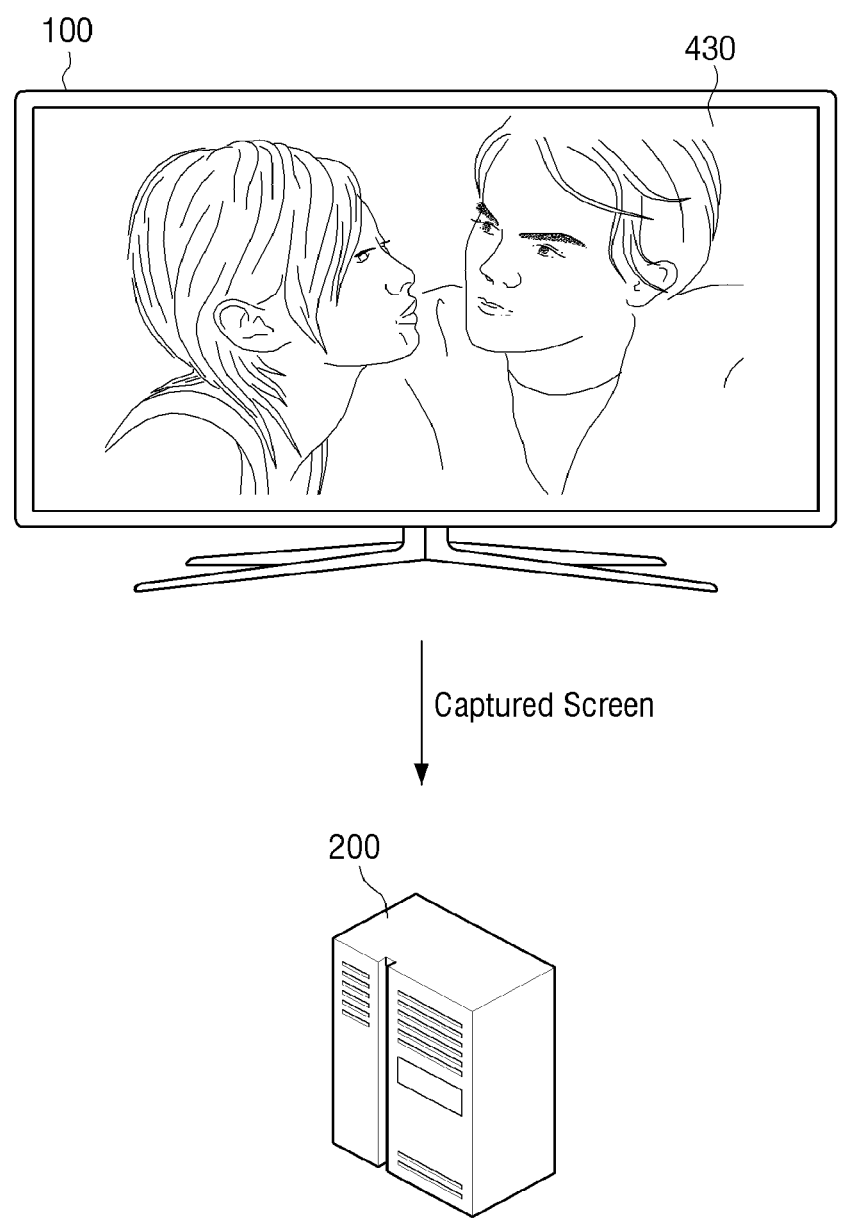
Figure 6A:
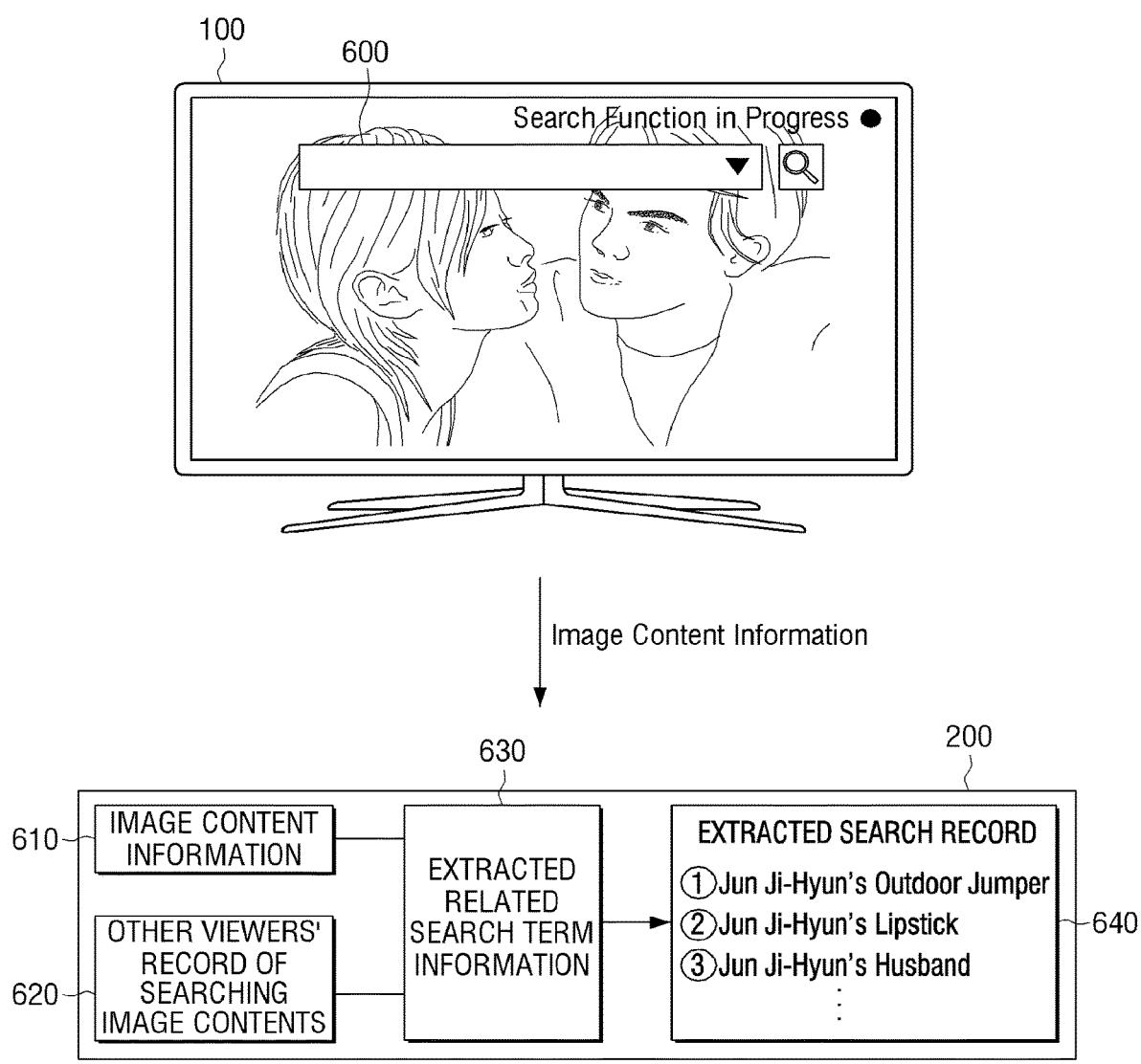
FIGS. 6A and 6B are views illustrating a function of an external server extracting information on a search record while a search function is executed according to an exemplary embodiment.
Figure 6B:
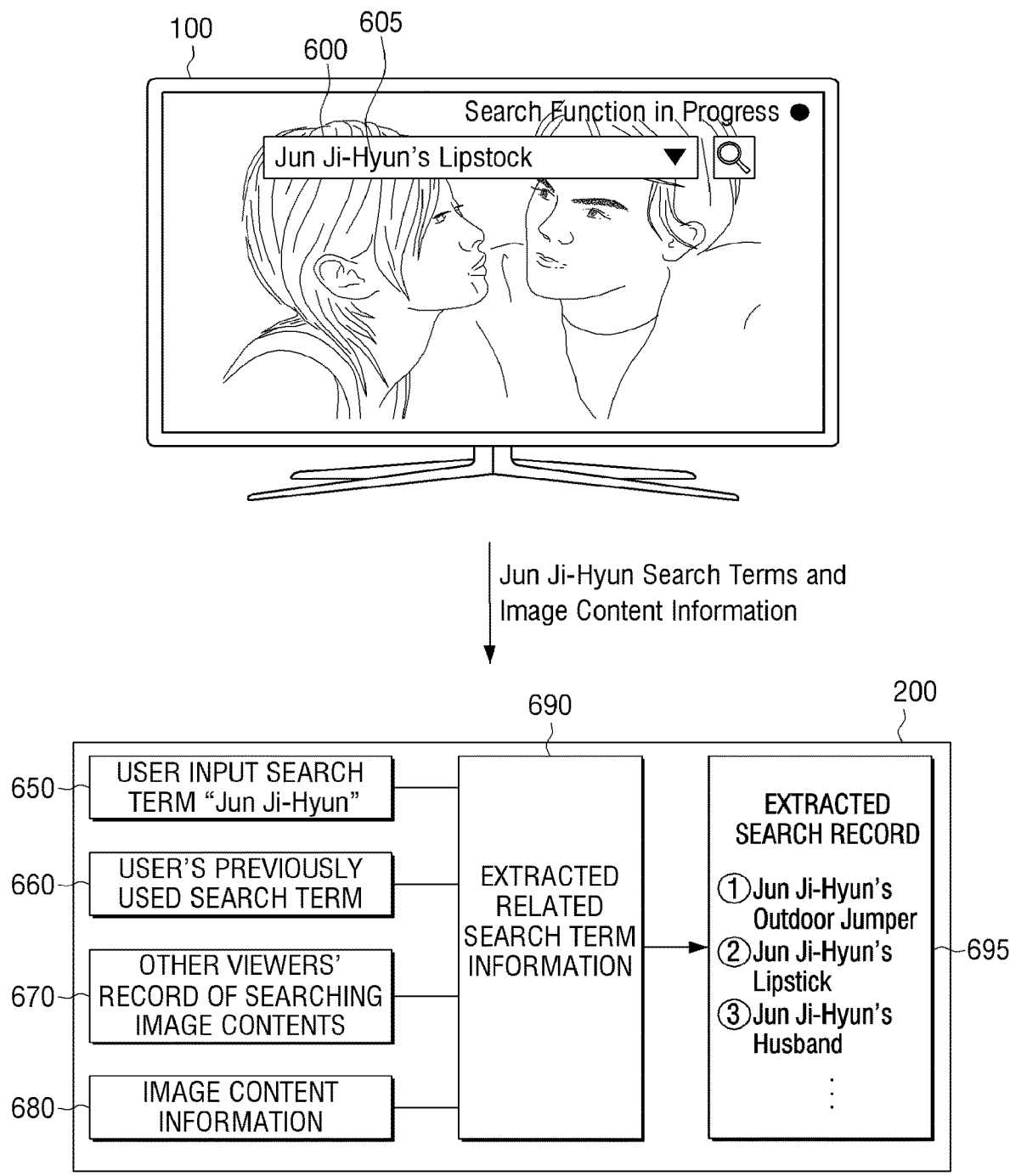
Figure 7:
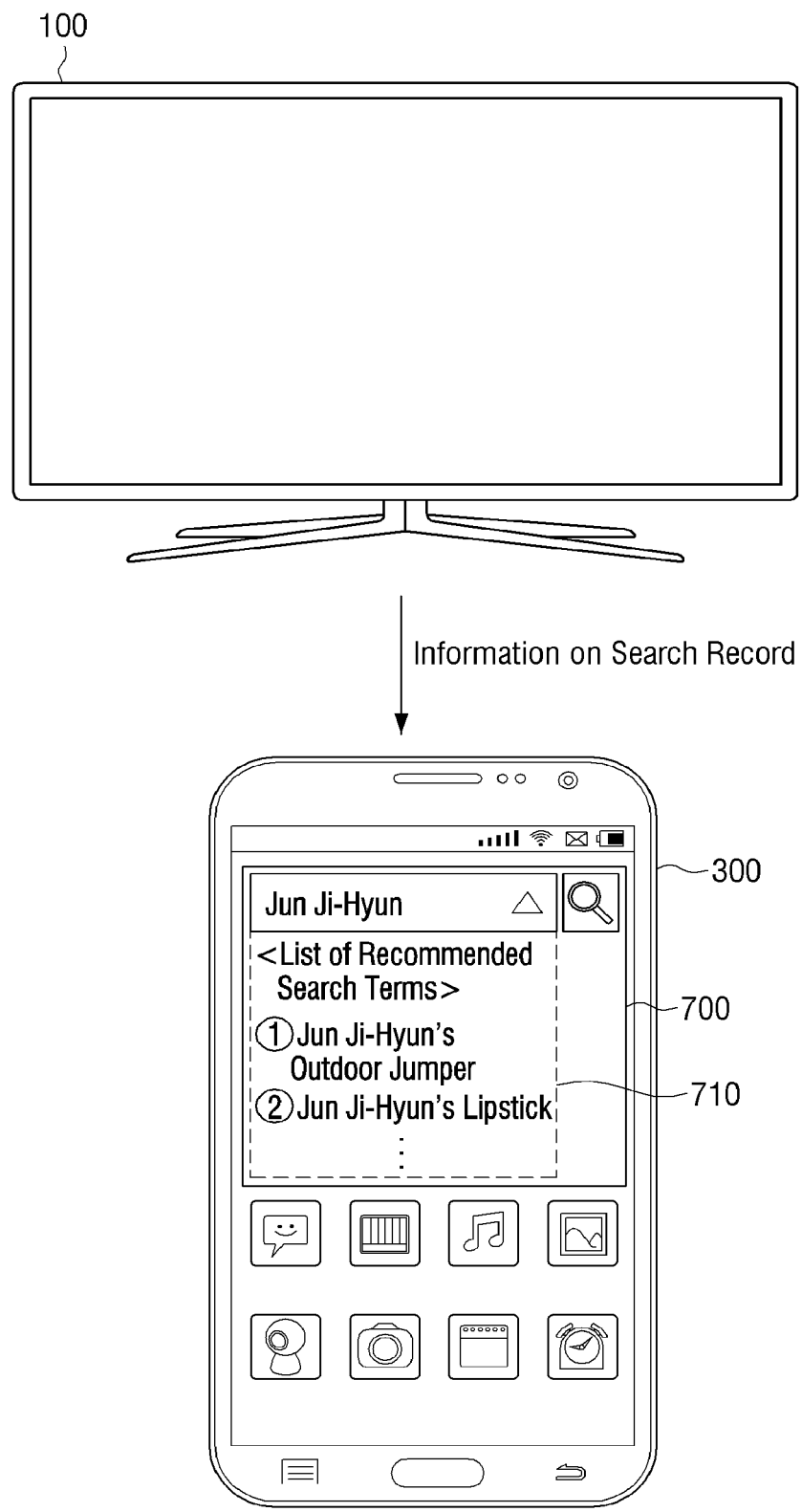
FIG. 7 is a view illustrating a function of a display apparatus transmitting information on viewers' search record and related search term information to an external device.

FIGS. 4A and 4B are views illustrating a search function of the display apparatus 100 according to an exemplary embodiment. FIGS. 5A and 5B are views illustrating a function of displaying a list of recommended search terms or a list of corrected search terms based on information that the display apparatus 100 receives from the external server 200 while executing a search function according to an exemplary embodiment. FIGS. 6A and 6B are views illustrating a function of the external server 200 extracting information on a search record while a search function is executed according to an exemplary embodiment. FIG. 7 is a view illustrating a function of the display apparatus 100 transmitting information on viewers' search record and related search term information to the external device 300.

Referring again to FIG. 3, in response to the search function being performed while an image content is displayed, the controller 380 may control the communicator 350 to transmit information on the image content to the external server 200, and receive information on a search record of viewers who are watching the image content from the external server 200. In this case, the controller 380 may provide the information on the search record.

For example, as shown in FIG. 4A, the UI 400 saying "Do you want to use a search function?" is displayed on the display 330 of the display apparatus 100, and, in response to the user inputting the selection of YES 410 instead of NO 420, the controller 380 may execute the search function of the display apparatus 100.

Referring again to FIG. 3, according to an exemplary embodiment, the information on the image content described above may be EPG information of the image content, a captured screen of the image content, and metadata. The controller 380 may analyze the currently reproduced image content based on the EPG information, and control the communicator 350 to transmit the result of the analyzing to the external server 200 as the information on the image content. In this case, the EPG information is information for providing a broadcast program schedule table, and refers to a variety of information displayed on the screen, such as channels, titles of programs, broadcasting time, genre, detailed information of programs, etc. In addition, the controller 380 may capture the screen of the image content, and control the communicator 350 to transmit the captured screen to the external server 200 as the information on the image content.

For example, as shown in FIG. 4B, the controller 380 captures a screen 430 of the image content that is currently displayed, and transmits the captured screen 430 to the external server 200.

In addition, the external server 200 may receive at least one among the EPG information, the captured screen, and the metadata as the information on the image content. Thereafter, the external server 200 may extract information on a search record of viewers using at least one among the information on the image content, a search term that is inputted by the user when the user inputs the search term, a search term that was previously searched by the user, and a search term record of other viewers on the image content. In this case, when the separate external server 250 is provided as shown in FIG. 1, the separate external server 250 may store the information on the image content, and the other viewers' search record on the same image content.

Referring again to FIG. 3, according to an exemplary embodiment, in response to the search function of the display apparatus 100 being executed, the controller 380 may transmit the information on the image content (EPG information, the captured screen of the image content, the metadata, etc.) to the external server 200, and then receive the information on the search record of the viewers who are watching the image content from the external server 200. In this case, the information on the search record of the viewers may include at least one among the search term record of the other viewers on the image content and the record of a search term that was previously searched by the user. The controller 380 may analyze the information on the viewers' search record in real time, and provide recommendation information for the user to input.

For example, as shown in FIG. 5A, when the user does input, in a search box 500, a search term 510 regarding the currently displayed image content while the display apparatus 100 executes the search function, the controller 380 may transmit only the information on the image content (for example, the EPG information, the captured screen, and the metadata) to the external server 200. In this case, the external server 200 may extract the information on the viewers' search record using at least one among the information on the image content, the record of a search term that was previously searched by the user, and other viewers' search record on the image content. In addition, the external server 200 may transmit the extracted viewers' search record to the display apparatus 100. Thereafter, the controller 380 of the display apparatus 100 may control the communicator 350 to receive the information on the viewers' search record (the other viewers' search term record on the image content, the record of the search term that was previously searched by the user, etc.). Thereafter, the controller 380 may analyze the viewers' search record in real time, and control the display 330 to display a list 520 of recommended search terms for the user to input, such as ① Jun Ji-Hyun's Outdoor Jumper, ② Jun Ji-Hyun's Lipstick, ③ Jun Ji-Hyun's Husband, etc.

According to an exemplary embodiment, when the user inputs a search term regarding the currently displayed image content while the display apparatus 100 executes the search function, the controller 380 may analyze the search term that is inputted by the user in real time based on the information on the viewers' search record received from the external server 200, and control the display 330 to display search term correction information related to the user's input search term.

For example, as shown in FIG. 5B, it is assumed that, while the display apparatus 100 executes the search function, the user incorrectly inputs, in the search box 500, "Jun Ji-Hyun's Lipstock" as a search term 530 related to Jun Ji-Hyun's Lipstick regarding the currently displayed image content (500). The controller 380 may transmit the inputted search term 530 (Jun Ji-Hyun's Lipstock) and the information on the image content (for example, the EPG information, the captured screen, the metadata, etc.) to the external server 200. In this case, the external server 200 may extract the information on the viewers' search record using at least one among the image content information (the EPG information, the metadata, and the captured screen), the search term 530 inputted by the user (Jun Ji-Hyun's Lipstock), the search term that was previously searched by the user, and the other viewers' search record on the image content. In this case, the external server 200 may transmit the extracted information on the viewers' search record to the display apparatus 100. Thereafter, the controller 380 of the display apparatus 100 may analyze the user's input "Jun Ji-Hyun's Lipstock" in real time based on the information on the viewers' search record, and then controls the display 330 to display a list 540 of corrected search terms including "Jun Ji-Hyun's Lipstick" in relation to the user's input search term 510 "Jun Ji-Hyun's Lipstock." That is, the controller 380 may analyze the user's input search term in real time, and provide a correction search term list UI.

In an exemplary embodiment, a list of corrected search terms is displayed when the user incorrectly inputs a search term. However, this is an example, and, when the user correctly inputs a search term, a list of search terms related to the user's input search term may be displayed.

In an exemplary embodiment, the display apparatus 100 analyzes the viewers' search term information received from the external server 200 in real time, and extracts search term information related to the image content. However, according to another exemplary embodiment, the external server 200 may directly extract search term information related to the image content, and transmit the search term information to the display apparatus 100.

In response to the search function of the display apparatus 100 being performed, the controller 380 may control the communicator 350 to transmit image content information (for example, EPG information, a captured screen, metadata, etc.) to the external server 200. In this case, the external server 200 may analyze the information on the image content (for example, the EPG information, the captured screen, the metadata, etc.), a search term when the user inputs the search term, a search term that was previously inputted by the user, and other viewers' search term record on the image content in real time, and extract search term information related to the image content.

For example, as shown in FIG. 6A, when the user does not input, in a search box 600, a search term regarding the currently displayed image content while the display apparatus 100 executes the search function, the controller 380 transmits only the information on the image content (for example, the EPG information, the captured screen, and the metadata) to the external server 200. In this case, the external server 200 extracts search term information 630 related to the image content using at least one among received image content information 610, the search term that was previously searched by the user, and other viewers' record 620 of searching the image contents. In addition, the external server 200 may transmit an extracted relevant search term record 640 (①) Jun Ji-Hyun's Outdoor Jumper, (②) Jun Ji-Hyun's Lipstick, (③) Jun Ji-Hyun's Husband, etc.) to the display apparatus 100.

In another example, as shown in FIG. 6B, when the user incorrectly inputs, in the search box 600, "Jun Ji-Hyun's Lipstock" as a search term 605 related to "Jun Ji-Hyun's Lipstick" regarding the currently displayed image content while the display apparatus 100 executes the search function, the controller 380 transmits the inputted search term 605 (Jun Ji-Hyun's Lipstock) and the information on the image content (for example, the EPG information, the captured screen, the metadata, etc.) to the external server 200. In this case, the external server 200 analyzes receive image content information 680 (the EPG information and the captured screen), the search term 650 inputted by the user (Jun Ji-Hyun's Lipstock), a search term 660 that was previously searched by the user, and other viewers' record 670 of searching the image contents in real time, and extracts search term information related to the image content. In this case, the external server 200 may transmit an extracted search record 695 ((①) Jun Ji-Hyun's Outdoor Jumper, (②) Jun Ji-Hyun's Lipstick, (③) Jun Ji-Hyun's Husband, etc.) to the display apparatus 100.

Thereafter, the controller 380 of the display apparatus 100 may control the display 330 to display the search term information related to the image content (the extracted search record-(①) Jun Ji-Hyun's Outdoor Jumper, (②) Jun Ji-Hyun's Lipstick, (③) Jun Ji-Hyun's Husband, etc.), as shown in FIG. 5A, for the user to input a search term among the displayed search term information. The controller 380 may control the display 330 to display a list of recommended search terms.

According to an exemplary embodiment, in response to the display apparatus 100 interworking with the external device 300, the controller 380 of the display apparatus 100 may control the communicator 350 to display the received information on the search record to the external device 300.

For example, as shown in FIG. 7, the controller 380 of the display apparatus 100 controls the communicator 350 to transmit the received information on the search record or the list of recommended search terms to the external device 300. In this case, the external device 300 displays a list 710 of recommended search terms on a display 700.

In an exemplary embodiment, only the list of search terms is transmitted to the external device 300. However, this is an example, and the display apparatus may transmit a variety of information received from the external server 200 to the external device 300.

In addition, in an exemplary embodiment, the external device 300 is included in the search system. However, this is an example, and the search system may not include the external device 300. In addition, the external servers 200 and 250 are provided separately from the display apparatus 100. However, this is an example, and the display apparatus 100 may include the servers 200 and 250 therein. Other variations may be provided.

FIGS. 8A, 8B, 9A, and 9B are views illustrating an on demand service of a video on demand (VOD) or a DVD using a search function of the display apparatus 100 according to one or more exemplary embodiments.

According to an exemplary embodiment, in response to the user inputting a broadcast program search related to a currently displayed image content while the display apparatus 100 executes the search function and the on demand service, the controller 380 may control the communicator 350 to transmit an inputted search term to the external server 200, and the external server 200 may extract image information desired by the user using the search term inputted by the user, information on the image content (for example, EPG information, a captured screen, metadata, etc.), and other information related to the search term (for example, a search term that was previously searched by the user, and other viewers' search record on the image content). Thereafter, the controller 380 of the display apparatus 100 may provide the image information related to the search term inputted by the user.

Figure 8A:
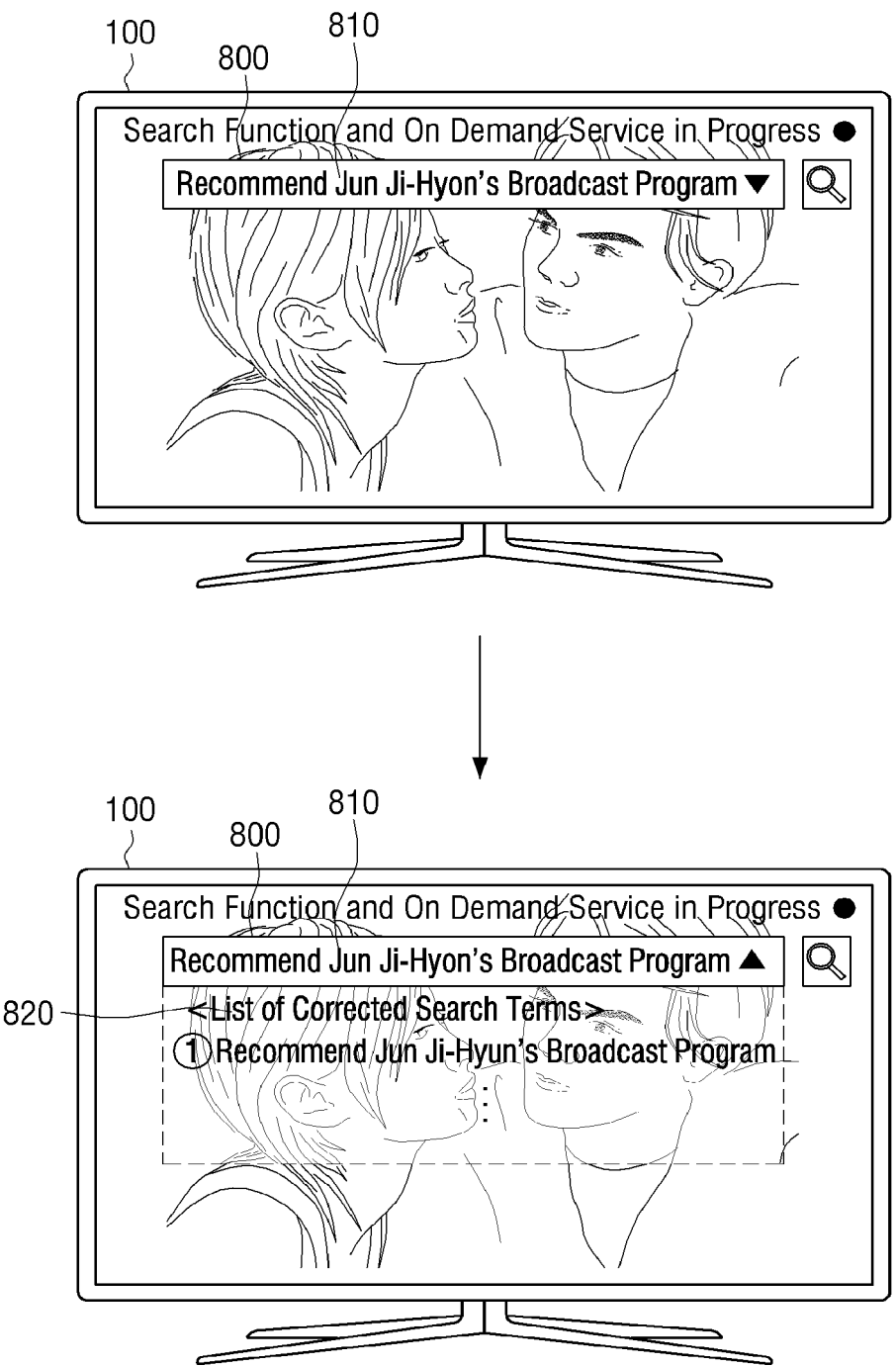

For example, as shown in FIG. 8A, it is assumed that the user incorrectly inputs, in a search box 800, a search term 810 "Please search a broadcast program with Jun Ji-Hyon." As described above, the external server 200 may extract information on viewers' search record using the incorrectly inputted search term 810, and the information on the image content (for example, the EPG information, the captured screen, the metadata, etc.), and may extract a recommendation broadcast program with "Jun Ji-Hyun" that is closely related to the incorrectly inputted search term "Jun Ji-Hyon."

Thereafter, in the same way as in an exemplary embodiment, the controller 380 of the display apparatus 100 may analyze the search term inputted by the user in real time based on the information on the viewers' search record that is received from the external server 200, and displays a list 820 of corrected search terms (① Recommend Jun Ji-Hyun's Broadcast Program) related to the user's inputted search term 810 "Please search a broadcast program with Jun Ji-Hyon."

Figure 8B:
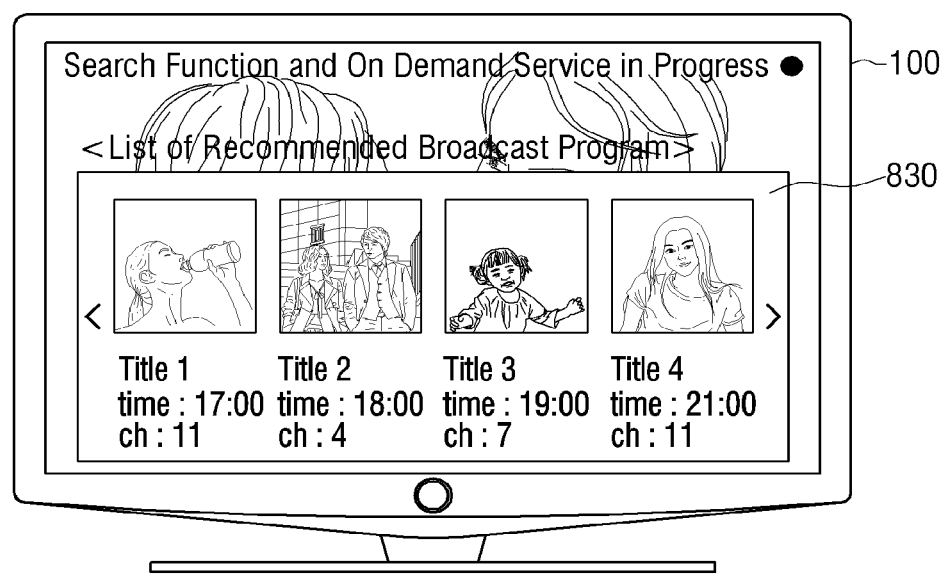

Thereafter, as shown in FIG. 8B, the display apparatus 100 display a list 830 of recommended image information or broadcast programs related to the user's inputted search term that is received from the external server 200 and selected by the user.

In an exemplary embodiment, the external server 200 may extract the broadcast program with "Jun Ji-Hyun" (the corrected and selected search term "Jun Ji-Hyun") using the received EPG information, and transmit the broadcast program to the display apparatus 100. However, this is an example.

That is, the external server 200 may extract a content complying with the user's input intention from the contents stored in the VOD server and another external device (for example, a DVD device) connected with the display apparatus 100, in addition to the EPG information, and transmit a result of the extracting to the display apparatus 100.

For example, as shown in FIG. 9A, it is assumed that the user inputs, in a search box 900, a search term 910 "Please search a broadcast program with Jun Ji-Hyun (actor/actress's name)." In this case, as described above, the external server 200 may extract information on viewers' search record using the inputted search term 910, and the information on the image content (for example, the EPG information, the captured screen, the metadata, etc.), and may extract a recommendation broadcast program with "Jun Ji-Hyun."

Thereafter, in the same way as in an exemplary embodiment, the controller 380 of the display apparatus 100 may analyze the search term inputted by the user in real time based on the information on the viewers' search record that is received from the external server 200, and displays a list 920 of recommended search terms (① Jun Ji-Hyun's Broadcast Program and ② Kim Soo-Hyun's Broadcast Program) related to the user's inputted search term 910 "Please search a broadcast program with Jun Ji-Hyun (actor/actress's name)."

Figure 9B:
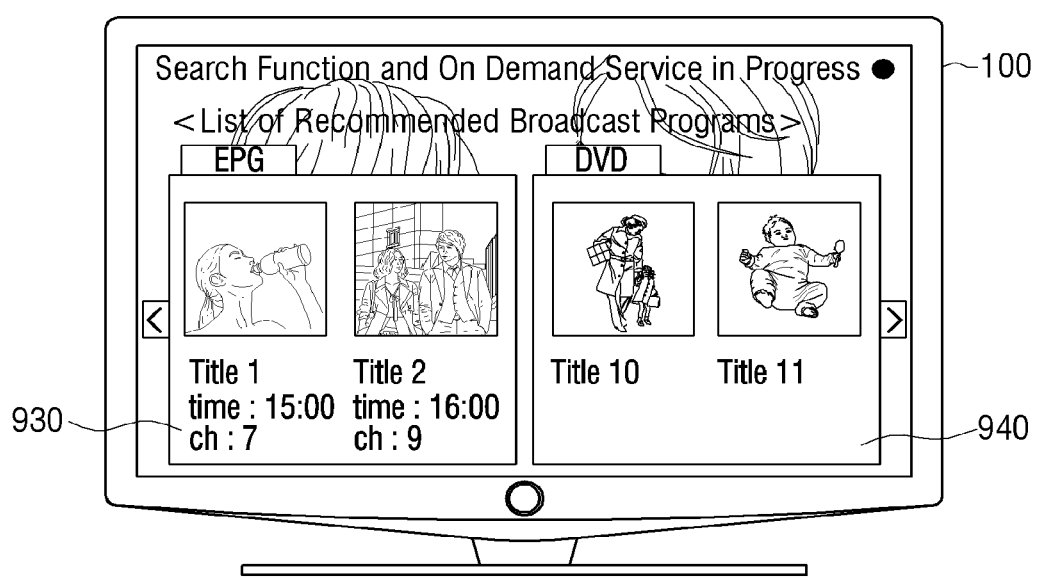

Thereafter, as shown in FIG. 9B, the external server 200 may extract a program with the recommended search term "Jun Ji-Hyun" (actor/actress's name) that is selected by the user, from the contents stored in the VOD service and another external device (for example, a DVD device) connected with the display apparatus 100, in addition to the EPG information received from the display apparatus 100, and transmit the extracted program information to the display apparatus 100. The display apparatus 100 displays a list of recommended image information 930 and 940 by classifying the contents by service. For example, when the broadcast programs with "Jun Ji-Hyun" (actor/actress's name) are searched from the EPG information and a DVD player connected with the display apparatus 100, the display apparatus 100 displays a list of the recommended image information 930 that includes broadcast programs searched from the EPG information, and a list of the recommended image information 940 that includes DVD contents searched from the DVD player on a single screen.

In an exemplary embodiment, the search term inputted by the user is corrected and the list of corrected search terms is displayed, and then, a list of recommended broadcast programs related to the corrected search term is displayed. However, this is an example. When the user does not input a search term, a list of recommended search terms and a list of broadcast programs related thereto may be displayed.

For example, referring again to FIG. 9A, if the user does not input a search term regarding a currently displayed image content while the display apparatus 100 executes the search function and the on demand service, the controller 380 may transmit information on the image content (for example, EPG information, a captured screen, metadata, etc.) to the external server 200, and the external server 200 may extract information on viewers' search record and recommendation broadcast program information related to the extracted information on the viewers' search record using the information on the image content and pre-stored information (for example, a search term that was previously searched by the user, and the other viewer's search record on the image content), etc. Thereafter, the controller 380 of the display apparatus 100 may analyze the information on the viewers' search record that is received from the external server 200 in real time, and display the list 920 of recommended search terms in order for the user to input. In this case, in response to the user selecting one from the list 920 of recommended search terms, the controller 380 may display a list of recommended broadcast programs related to the selected search term (see FIGS. 8B and 9B).

In addition, in an exemplary embodiment, the user inputs the search term through the user inputter. However, this is an example, and the user may input the search term through various input devices such as a voice input unit, a touch screen, a pointing device, etc.

FIG. 10 is a flowchart illustrating a method for providing a search function of the display apparatus 100 according to one or more exemplary embodiments.

In operation S1010, the display apparatus 100 displays an image content.

In operation S1020, the display apparatus 100 determines whether to perform or execute a search function. In response to the display apparatus 100 determining to perform the search function, the display apparatus 100 continues in operation S1030. Otherwise, the display apparatus 100 ends the method.

In operation S1030, the display apparatus 100 transmits information on the image content to the external server 200. In this case, the information on the image content may be EPG information on the currently displayed image content, and a captured screen of the image content.

In operation S1040, the display apparatus 100 receives information on viewers' search record from the external server 200. The external server 200 may extract the information on the viewers' search record using at least one among the information on the image content and the other viewers' search term record on the image content. In addition, in response to a search term inputted by the user being received from the display apparatus 100, the external server 200 may extract the information on the viewers' search record using at least one among the information on the image content, the search term inputted by the user, a search term that was previously inputted by the user, and the other viewers' search record on the image content. Thereafter, the display apparatus 100 may receive the information on the viewers' search record from the external server 200.

In operation S1050, the display apparatus 100 provides related search term information based on the information on the viewers' search record. As described above, when the user does not input a search term, the display apparatus 100 may display the list 520 of recommended search terms in order for the user to input as shown in FIG. 5A. In addition, when the user inputs the search term 530 but incorrectly inputs the search term 530 as shown in FIG. 5B, the display apparatus 100 may display the list 540 of corrected search terms.

According to one or more exemplary embodiments described above, the user may control the search function of the display apparatus 100 more easily and efficiently.

Figure 11:
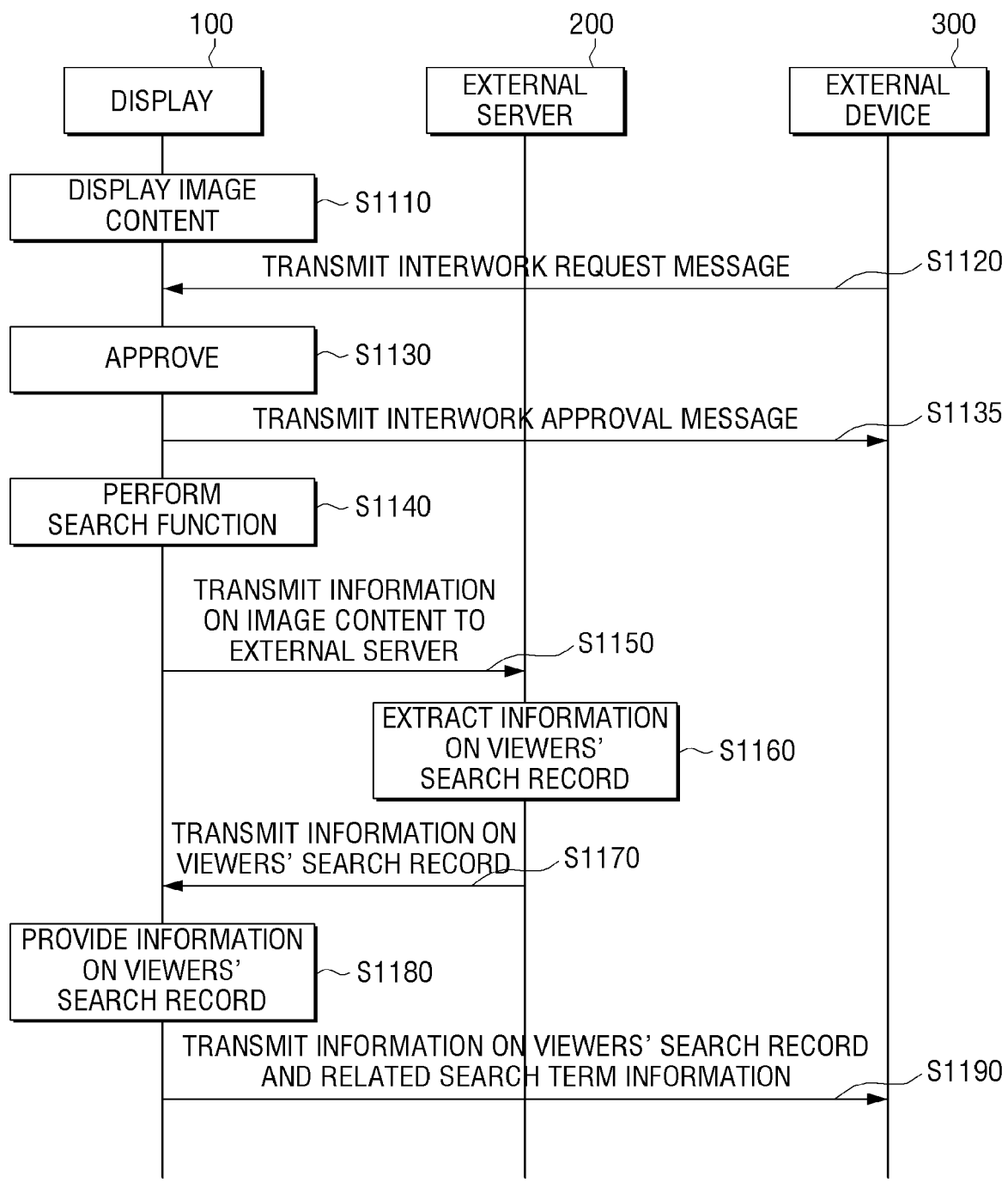
FIG. 11 is a sequence diagram illustrating a search function of a display apparatus when the display apparatus interworks with an external device according to one or more exemplary embodiments.

FIG. 11 is a sequence diagram illustrating a search function of the display apparatus 100 when the display apparatus 100 interworks with the external device 300 according to one or more exemplary embodiments.

In operation S1110, the display apparatus 100 displays an image content.

In operation S1120, when the user wants the external device 300 to interwork with the display apparatus 100, the external device 300 transmits an interwork request message to the display apparatus 100.

In operation S1130, the display apparatus 100 approves of the external device 300 interworking therewith, and in operation S1135, the display apparatus 100 transmits an interwork approval message to the external device 300.

In operation S1140, the display apparatus 100 performs a search function, and in operation S1150, the display apparatus 100 transmits information on the image content to the external server 200. In this case, the information on the image content may be EPG information of the currently displayed image content, and a captured screen of the image content.

In operation S1160, the external server 200 extracts information on viewers' search record based on the information received from the display apparatus 100. In response to a search term inputted by the user being received from the display apparatus 100, the external server 200 may extract the information on the viewers' search term using at least one among the information on the image content (for example, the EPG information and the captured screen), the search term inputted by the user, a search term that was previously inputted by the user, and the other viewers' search term record on the image content. In addition, in response to no search term being received from the display apparatus 100, the external server 200 may extract the information on the viewers' search record using at least one among the information on the image content and the other viewers' search term record on the image content.

In operation S1170, the external server 200 transmits the information on the viewers' search record to the display apparatus 100.

In operation S1180, the display apparatus 100 provides the information on the viewers' search record.

In operation S1190, the display apparatus 100 transmits the information on the viewers' search record to the external device 300.

In addition, the exemplary embodiments may also be implemented through computer-readable code and/or instructions on a medium, e.g., a computer-readable medium, to control at least one processing element to implement any above-described embodiments.

The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of controlling a display apparatus for searching, the method comprising:
  displaying, by the display apparatus, an image content;
  in response to the image content being displayed by the display apparatus, receiving an input from a first viewer of the image content to perform a search function at a first time;
  in response to receiving the input at the first time, acquiring, by the display apparatus, information of the displayed image content while the image content is displayed;
  transmitting, by the display apparatus, the acquired information to an external server while the image content is displayed;
  receiving, by the display apparatus from the external server, a recommended search term that corresponds to the acquired information while the image content is displayed; and
  displaying, by the display apparatus, the recommended search term;

wherein the recommended search term has been searched by a second viewer who is viewing the image content, the second viewer being different from the first viewer.

2. The method of claim 1, further comprising:
in response to the search function being performed, analyzing the image content that is currently displayed, based on information of an electronic program guide;
transmitting, by the display apparatus, a result of the analyzing to the external server; and
receiving, by the display apparatus from the external server, the recommended search term that is used by the second viewer regarding the displayed image content, based on the transmitted result of the analyzing.

3. The method of claim 1, wherein the recommended search term is a plurality of recommended search terms and comprises a first search term that is used by the second viewer regarding the image content and a second search term that is previously used by the first viewer of the display apparatus.

4. The method of claim 1, wherein the displaying of the recommended search term comprises:
analyzing the recommended search term in real time; and
displaying the recommended search term that is inputtable by the first viewer of the display apparatus, based on a result of the analyzing.

5. The method of claim 1, wherein the displaying the recommended search term comprises:
receiving a search term from the first viewer of the display apparatus;
analyzing the received search term in real time, based on the received recommended search term; and
displaying at least one search term that corrects the received search term, based on a result of the analyzing.

6. The method of claim 1, further comprising transmitting, to an external device, at least one of the recommended search term and information related to the recommended search term.

7. A display apparatus for searching, the display apparatus comprising:
a display configured to display an image content;
a communicator configured to communicate with at least one of an external server and an external device; and
a controller configured to:
in response to the image content being displayed by the display apparatus, receive an input from a first viewer of the image content to perform a search function at a first time,
in response to receiving the input at the first time, acquire information of the displayed image content while the image content is displayed,
control the communicator to transmit the acquired information to the external server while the image content is displayed;
receive, from the external server, a recommended search term that corresponds to the acquired information while the image content is displayed, and
control the display to display the recommended search term,
wherein the recommended search term has been searched by a second viewer who is viewing the image content, the second viewer being different from the first.

8. The display apparatus of claim 7, wherein the controller is further configured to:
if the search function is performed, analyze the image content that is currently displayed, based on information of an electronic program guide;
control the communicator to transmit a result of the analyzing to the external server; and
receive, from the external server, the recommended search term that is used by the second viewer regarding the displayed image content, based on the transmitted result of the analyzing.

9. The display apparatus of claim 7, wherein the recommended search term is a plurality of recommended search terms and comprises a first search term that is used by the second viewer regarding the image content and a second search term that is previously used by the first viewer of the display apparatus.

10. The display apparatus of claim 7, wherein the controller is further configured to:
analyze the recommended search term in real time; and
control the display to display the recommended search term that is inputtable by the first viewer of the display apparatus, based on a result of the analyzing.

11. The display apparatus of claim 7, wherein the controller is further configured to:
receive a search term from the first viewer of the display apparatus;
analyze the received search term in real time, based on the received recommended search term; and
display at least one search term that corrects the received search term, based on a result of the analyzing.

12. The display apparatus of claim 7, wherein the controller is further configured to control the communicator to transmit, to the external device, at least one of the recommended search term and information related to the recommended search term.

13. A search function execution system comprising:
a display apparatus;
an external server; and
an external device;
wherein the display apparatus is configured to:
in response to an image content being displayed by the display apparatus, receive an input from a first viewer of the image content to perform a search function at a first time, and
in response to receiving the input at the first time, acquire information of the displayed image content while the image content is displayed, and transmit the acquired information to the external server while the image content is displayed, wherein the external server is configured to:
extract a recommended search term that corresponds to the acquired information while the image content is displayed,
the recommended search term having been searched by a second viewer who is viewing the image content, the second viewer being different from the first viewer, and
transmit the extracted recommended search term to the display apparatus,
wherein the display apparatus is further configured to display information of the recommended search term, and
wherein the external device is configured to receive, from the display apparatus, at least one of the extracted recommended search term and information related to the extracted recommended search term.

14. The search function execution system of claim 13, wherein
the display apparatus is configured to transmit a screen of the displayed image content to the external server, and the external server is further configured to extract the recommended search term based on the transmitted screen and at least one search term that is used by a plurality of viewers other than the first viewer regarding the image content.

15. The search function execution system of claim 13,
the display apparatus is configured to transmit a screen of the displayed image content to the external server, and
wherein the external server is further configured to:
   receive, from the display apparatus, a search term that is input by the first viewer of the display apparatus; and
   extract the recommended search term based on at least one of the received search term, the transmitted screen, at least one search term that is used by a plurality of viewers other than the first viewer regarding the image content, and at least one search term that is previously used by the first viewer of the display apparatus.

16. The search function execution system of claim 13, wherein the display apparatus is further configured to display information about a broadcast program related to the recommended search term that is displayed.

\* \* \* \* \*